United States Patent

[11] 3,612,671

| [72] | Inventor | Henri Wermeille<br>Vaud, Switzerland |
|---|---|---|
| [21] | Appl. No. | 838,094 |
| [22] | Filed | July 1, 1969 |
| [45] | Patented | Oct. 12, 1971 |
| [73] | Assignee | Paillard S. A.<br>Sainte-Croix, Vaud, Switzerland |
| [32] | Priority | July 9, 1968 |
| [33] | | Switzerland |
| [31] | | 10222/68 |

[54] CINEMATOGRAPHIC CAMERA
7 Claims, 4 Drawing Figs.

[52] U.S. Cl. .................................................. 352/208,
352/141
[51] Int. Cl. ....................................................... G03b 9/10
[50] Field of Search ........................................ 352/166–170,
141, 208, 219, 206

[56] References Cited
UNITED STATES PATENTS

| 3,057,251 | 10/1962 | Mahn | 352/171 X |
|---|---|---|---|
| 3,099,193 | 7/1963 | Freudenschuss | 352/141 X |
| 3,248,166 | 4/1966 | Reinsch | 352/167 X |
| 3,486,814 | 12/1969 | Kubota | 352/208 X |

*Primary Examiner*—Donald O. Woodiel
*Attorneys*—Emory L. Groff and Emory L. Groff, Jr.

ABSTRACT: In a cinematographic camera a shutter, formed by a sector with parallel faces, is interposable between an objective and a film, and is arranged to reflect rays over all its blanking zone to a photosensitive element. Means are provided for lowering the light flux transmission towards the photosensitive element in the normal rest position of the shutter.

PATENTED OCT 12 1971 3,612,671

INVENTOR

HENRI WERMEILLE

BY Emory L. Groff Jr.
ATTORNEY

CINEMATOGRAPHIC CAMERA

The active zone of the shutter has on the objective side a reflecting power constant over all of its surface except for a portion of the zone utilized for blanking the light flux when the camera is not operating. This portion is of translucent material and its surface on the film side, which can be frosted, reflects back the light rays from the objective towards the photosensitive element. The shutter may be made entirely of translucent material having an absorptivity in the visible spectrum determined as a function of the blanking ratio.

The present invention relates to a cinematographic camera.

Cinematographic cameras are already known which comprise a reflecting shutter and at least one photosensitive element arranged so as to receive the rays reflected by the shutter in all its blanking positions, means being provided to lower the transmission factor of the light flux towards the photosensitive element in the normal rest position of the shutter.

Several solutions have already been proposed to produce means intended to lower the amount of light transmission towards the photosensitive element.

One known solution consists of providing, on the active zone of the shutter, a portion of surface having an attenuated power of reflection, so that this reflecting power is substantially equal to the average value of reflection obtained during the rotation of the shutter. This average value is determined by the aperture angle of the shutter, during which there is no reflection, by the angle of the shutter during which there is a maximum reflection, and by the angle which the portion with attenuated reflecting power covers.

The production of such shutters is relatively complicated, since it is necessary to provide two different treatments on the same part to obtain the zone with maximum reflecting power and the portion of the surface with attenuated reflecting power.

Other solutions have also been proposed, especially that consisting of providing the shutter with an opaque screen, masking in the rest position of the shutter, a portion of the light beam directed toward the photosensitive element, so as to obtain from the latter, in the case of unchanged lighting conditions, an indication independent of the fact whether the shutter is driven in rotation or not.

It is an object of the present invention to provide particularly simple means, intended to avoid modification of the signal furnished by the photosensitive element as a function of the rest position or of the rotation of the shutter.

Other objects and advantages will emerge from the description which follows.

According to the invention, there is provided a cinematographic camera comprising a shutter and at least one photosensitive element arranged so as to receive rays reflected by the shutter in all its blanking positions, means being provided to lower the transmission ratio of the light flux towards the photosensitive element in the normal rest position of the shutter, the shutter being formed by a body with substantially parallel faces defining adjacent active and rest zones, said camera being characterized in that the active zone of the shutter has on the objective side a reflecting power constant over all of its surface, the rest zone obstructs the light flux when the camera is inoperative, this portion of the body being of translucent material, the face of this rest zone which is on the film side constituting a reflecting surface returning the light rays from the objective towards the photosensitive element.

In order that the invention may be more fully understood, one embodiment of a cinematographic camera according to the invention, is described below purely by way of illustrative but nonlimiting example, with reference to the accompanying diagrammatic drawing, in which.

Figure 1:
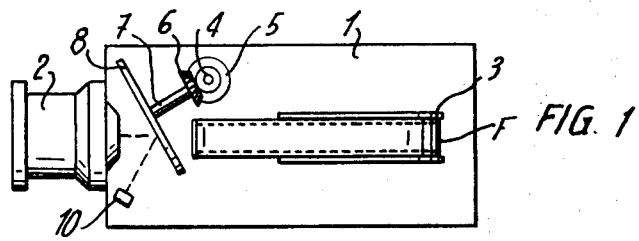
FIG. 1 is a plan view showing several inner elements of the camera.

With reference to FIG. 1, the camera comprises a casing 1 including an objective 2 and containing a spool 3 on which the film F to be exposed is wound. The camera comprises, of course, a takeup spool, which is not visible in the drawing, as well as film-driving means (not shown).

The motor of the camera drives a shaft 4 which transmits, through two bevel gears 5 and 6, a rotary motion to a shaft 7 on which a shutter 8 is mounted.

Figure 2:
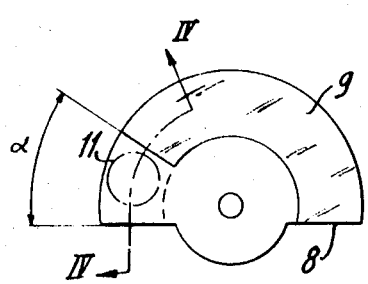
FIG. 2 is a front elevational view of the shutter.

The shutter shown in FIG. 2 has an active zone 9 comprising the greater part of its diameter which is intended to intercept, during each displacement of the film, the light beam coming from the objective 2.

With the exception of the rest zone α of the shutter which is situated in front of the aperture of the camera when the shutter is in its rest position, the zone 9 is treated so as to have a reflecting power, preferably as high as possible. Thus, during the blanking period, and as shown in FIG. 1 the light rays intercepted by the shutter 8 are reflected onto a photosensitive element 10. By manipulating the diaphragm of the objective, the amount of light emerging from the objective is adjusted to obtain the correct exposure value, which is indicated by a particular current from the photosensitive element, this current being fixed as a function of the sensitivity of the film used.

In the normal rest position of the shutter, the surface 11, defined by dotted lines in FIG. 2 is disposed facing the light rays coming from the objective. If this surface 11 of the rest zone reflected a light beam of the same intensity as the active zone 9, the photosensitive element 10 would receive, when the camera is not operating, a light beam more intense than the average value of the intensity of the reflected beam during the operation of the camera.

Figure 3:
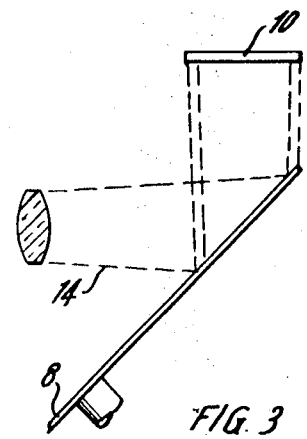
FIG. 3 is an enlarged view of a part of said embodiment.
Figure 4:
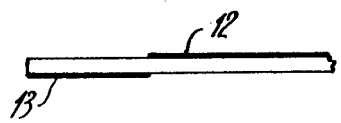
FIG. 4 is a section along IV—IV of FIG. 2.

To avoid this drawback, the rest zone α in which the surface 11 is contained, is not rendered reflective on the objective side surface like the active zone 9, but instead is reflective on the opposite face or film side, as indicated at 13 in FIG. 4. The shutter body 8 is made of translucent material having an absorptive power in the neighborhood of 25 percent. Thus, the light rays coming from the objective in the form of a beam 14, FIG. 3, are reflected, when the shutter is in its rest position by the reflecting surface 13 and thus traverse twice the thickness of the translucent material forming the shutter before reaching the photosensitive element. By reason of the absorption of the light rays by the translucent material, the reflected beam has an intensity amounting only to about 50 percent of that of the incident beam. In this manner there is obtained the necessary correction to obtain a constant indication from the photosensitive element 10, both during the rotation of the shutter as well as when it is in its rest position. It is, of course, understood that the reduction factor of the reflected beam depends among other things on the characteristic of the shutter and especially on the ratio between its aperture angle and its blanking angle. The absorptive power of the translucent material must hence be determined for a given shutter model by taking into account the geometrical characteristics of the latter.

The manufacture of such a shutter is obviously very simple, since the treatment intended to render the zones 9 and α reflecting is the same and is not modified afterwards to reduce the reflection ratio of one of the two treated surfaces, for example, by mechanical or chemical means.

It is well understood that the material constituting the shutter could, instead of being tinted, be perfectly transparent and subjected before being rendered reflecting to a treatment for increasing its light absorption ratio.

According to an advantageous modification, it is also possible to obtain the desired reduction of the ratio of reflection by providing a dulled surface on one and/or on the other of the surfaces of the portion of the shutter disposed in front of the objective when the camera is not operating.

In the case where the reflecting surface gives an undisturbed reflected beam, it is possible to use a part of the reflected beam for a reflex viewer, the other part serving to excite the photosensitive element.

Various changes and modifications in the specific embodiments may be made by those skilled in the art without departing from the essential concept of the invention as defined in scope by the appended claims.

I claim:

1. A cinematographic camera comprising, a shutter interposable between an objective and a film and at least one photosensitive element arranged so as to receive rays reflected by the shutter in all its blanking positions, said shutter including a body having an active zone and an adjacent rest zone, means provided to lower the amount of transmission of the light flux towards the photosensitive element when said shutter rest zone is disposed in the path of light rays from said objective, said shutter active zone including a sector having on the objective side of its body a reflecting surface intermittently blanking the light flux when said shutter is operating, said shutter body of said adjacent rest zone comprising a translucent material and the face of said translucent rest zone body which is on the film side of the shutter includes a reflecting surface sending back the light rays from the objective towards the photosensitive element.

2. A cinematographic camera according to claim 1, wherein the shutter is flat.

3. A cinematographic camera according to claim 2, wherein the opposite faces of said shutter body are parallel and said active zone reflecting surface is disposed in a plane offset from that of said rest zone reflecting surface.

4. A cinematographic camera according to claim 1, wherein the translucent material forming the shutter has an absorptive power in the visible light spectrum, determined as a function of the ratio between the aperture angle and blanking angle of the shutter.

5. A cinematographic camera according to claim 1, wherein the shutter has a dulled surface on one of the sides of the portion blanking the light flux when the camera is not operating.

6. A cinematographic camera according to claim 1, wherein the translucent material has an absorptive power in the neighborhood of 25 percent.

7. A cinematographic camera according to claim 1, wherein the material constituting the shutter is tinted.